(12) United States Patent
Borroni-Bird et al.

(10) Patent No.: US 7,750,796 B2
(45) Date of Patent: Jul. 6, 2010

(54) REGENERATIVE BRAKING HALO AND METHOD

(75) Inventors: Christopher E. Borroni-Bird, Oakland Township, MI (US); Joseph F. Mercurio, Birmingham, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 568 days.

(21) Appl. No.: 11/676,517

(22) Filed: Feb. 20, 2007

(65) Prior Publication Data

US 2007/0295544 A1 Dec. 27, 2007

Related U.S. Application Data

(60) Provisional application No. 60/805,892, filed on Jun. 27, 2006.

(51) Int. Cl.
*B60Q 3/04* (2006.01)

(52) U.S. Cl. ............... 340/438; 340/439; 340/441; 116/286

(58) Field of Classification Search ............... 180/165, 180/65.3; 116/286, 287, DIG. 36, 300, 62.1, 116/62.4; 340/438, 441, 461, 466
See application file for complete search history.

(56) References Cited

U.S. PATENT DOCUMENTS

| | | | | |
|---|---|---|---|---|
| 1,486,379 A * | 3/1924 | Jackson | ...... | 340/466 |
| 4,804,254 A * | 2/1989 | Doll et al. | ...... | 349/155 |
| 5,150,098 A * | 9/1992 | Rakow | ...... | 340/479 |
| 5,815,072 A * | 9/1998 | Yamanaka et al. | ...... | 340/461 |
| 5,949,330 A * | 9/1999 | Hoffman et al. | ...... | 340/438 |
| 6,127,806 A * | 10/2000 | Tanjo et al. | ...... | 320/132 |
| 6,320,500 B1 * | 11/2001 | Adelsson et al. | ...... | 340/441 |
| 6,333,688 B1 * | 12/2001 | Brown et al. | ...... | 340/479 |
| 6,587,043 B1 * | 7/2003 | Kramer | ...... | 340/435 |
| 6,675,650 B1 * | 1/2004 | Paulo | ...... | 73/491 |
| 6,717,376 B2 * | 4/2004 | Lys et al. | ...... | 315/292 |
| 6,794,853 B2 * | 9/2004 | Kondo | ...... | 320/132 |
| 6,888,448 B2 * | 5/2005 | Sandberg et al. | ...... | 340/441 |
| 6,922,139 B2 * | 7/2005 | Vågstedt | ...... | 340/438 |
| 7,075,423 B2 * | 7/2006 | Currie | ...... | 340/467 |
| 7,119,764 B2 * | 10/2006 | Tanaka et al. | ...... | 345/40 |
| 7,178,479 B1 * | 2/2007 | Richter | ...... | 116/288 |
| 7,248,175 B2 * | 7/2007 | Wu | ...... | 340/815.4 |
| 7,325,504 B2 * | 2/2008 | Tsumiyama | ...... | 114/55.5 |

(Continued)

FOREIGN PATENT DOCUMENTS

EP 1068976 A 1/2001

*Primary Examiner*—Paul N Dickson
*Assistant Examiner*—Brodie Follman
(74) *Attorney, Agent, or Firm*—Quinn Law Group, PLLC

(57) ABSTRACT

A variably illuminable display is provided for use with a vehicle having a regenerative braking capability with a detectable recharging rate. The display has a variable width, variable color, and variable intensity that are proportionately and continuously variable in response to the detected charging rate. The display is adapted to at least partially circumscribe a circular instrument gauge to thereby form an illuminable halo. A method is also provided for displaying the rate of energy transfer of a regenerative braking system aboard a vehicle, including detecting the recharging rate or rate of energy transfer of the regenerative braking process, communicating the detected recharging rate to a controllable display, and continuously varying at least one of the variable width, variable color, and variable intensity of the controllable display in proportion to the detected rate of energy transfer.

12 Claims, 1 Drawing Sheet

U.S. PATENT DOCUMENTS

| | | | |
|---|---|---|---|
| 7,369,044 B2 * | 5/2008 | Ono et al. | 340/461 |
| 7,382,234 B2 * | 6/2008 | Yokota et al. | 340/425.5 |
| 7,439,711 B2 * | 10/2008 | Bolton | 320/166 |
| 7,474,309 B2 * | 1/2009 | Kolpasky et al. | 345/440 |
| 7,501,939 B1 * | 3/2009 | Belikov et al. | 340/438 |
| 2002/0171541 A1 * | 11/2002 | Crombez et al. | 340/461 |
| 2003/0067384 A1 * | 4/2003 | Funayose et al. | 340/438 |
| 2005/0128065 A1 * | 6/2005 | Kolpasky et al. | 340/461 |

* cited by examiner

REGENERATIVE BRAKING HALO AND METHOD

CROSS REFERENCE TO RELATED APPLICATION

This application claims the benefit of U.S. Provisional Application No. 60/805,892, filed Jun. 27, 2006, which is hereby incorporated by reference in its entirety.

TECHNICAL FIELD

This invention relates generally to an illuminable display for use with a vehicle having a regenerative braking system, and in particular to a continuously variable illuminable display.

BACKGROUND OF THE INVENTION

Hybrid drive vehicles utilize multiple sources of energy in order to improve fuel efficiency and economy while reducing vehicle emissions, and typically include a rechargeable energy storage device that is electrically connected to at least one of the multiple energy sources. The multiple energy sources often include an internal combustion engine and at least one motor/generator, and the rechargeable energy storage device is usually a battery or battery pack having a high energy density. Other hybrid drive vehicles may alternately employ a fuel cell or other power source in place of the internal combustion engine in order to further reduce vehicle emissions.

In a conventional or single power source vehicle, an alternator is typically used to convert mechanical energy from the fuel consumed in the internal combustion engine into electrical energy. The electrical energy is then used to continually recharge a single battery. During braking of such a conventional vehicle, the energy expended during braking is largely wasted. However, unlike such conventional vehicles, hybrid vehicles and certain other vehicles are able capture or harness a substantial amount of this otherwise wasted braking energy in a process commonly referred to as regenerative braking, thereby achieving a significant portion of their enhanced fuel economy.

During regenerative braking aboard a hybrid vehicle, an electric motor operates in reverse rotational direction to thereby slow the vehicle and, in the process, to generate useful electricity that can recharge the onboard energy storage device or battery. On certain production hybrid vehicles, the status of this regenerative braking process is communicated to the driver and passengers through various static or animated displays positioned on a center display, or through a power flow meter located on an instrument cluster. In either case, the driver benefits from the experience of "seeing" free energy being usefully recycled for other beneficial uses aboard the vehicle. However, typical vehicle display methods and devices are often not designed in such a way as to elicit a satisfying emotional response commensurate with the positive feelings drivers of hybrid vehicles often have in driving their fuel efficient vehicles, and may require averting attention from the road in order to fully appreciate the magnitude of energy transfer.

SUMMARY OF THE INVENTION

Accordingly, an improved vehicle display is provided. The display is positioned with respect to an instrument gauge or a heads up display and has a variable appearance. The display is electrically connectable to the vehicle such that the variation in appearance of the display is responsive to, and thus indicative of, the rate of energy transfer or recharging rate provided by the vehicle's regenerative braking process. The status of the regenerative process is thereby instantly and continuously communicated in an emotional and direct manner without requiring the driver to avert attention from the roadway.

In one aspect of the invention, the display is an illuminable halo at least partially circumscribing an instrument gauge. The halo is minimized or preferably invisible while the vehicle is at a standstill and/or the rate of regenerative braking is otherwise zero, and has a variable width, variable intensity, and/or color that are proportionately and continuously variable in response to a detected battery recharging rate provided by the regenerative braking process.

In another aspect of the invention, a vehicle is provided including a motor/generator adapted to provide regenerative braking, an energy storage device, a detectable energy transfer rate corresponding to the rate of transfer between the motor/generator and energy storage device, an illuminable display, and a sensor configured to detect and transmit the detectable rate to the illuminable display, which has a variable width, intensity, and/or color that is proportionately variable in response to the detectable rate.

A method is also provided for displaying the rate of energy transfer between an energy storage device and a regenerative braking system aboard a vehicle, the method including detecting and communicating the rate to a variably illuminable display and sufficiently varying at least one of the width, color, and intensity of the display in response to the detected recharging rate provided by the regenerative braking.

The above objects, features and advantages, and other objects, features and advantages of the present invention are readily apparent from the following detailed description of the best mode for carrying out the invention when taken in connection with the accompanying drawings.

DESCRIPTION OF THE PREFERRED EMBODIMENTS

Figure 1:
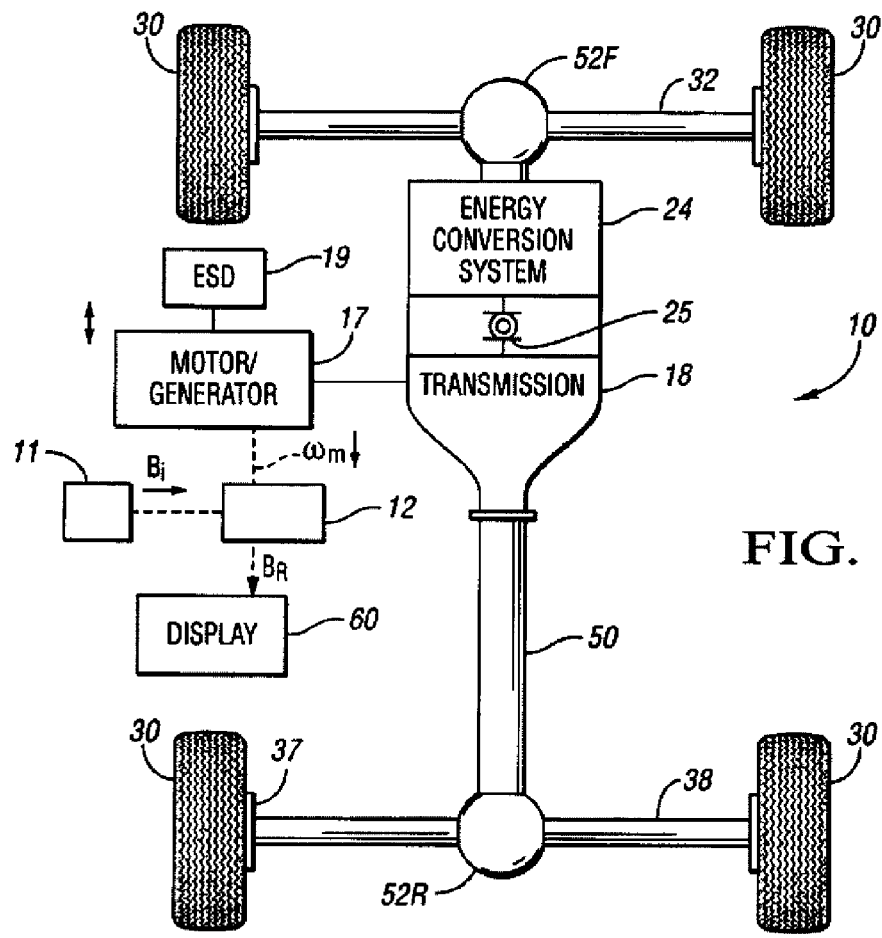
FIG. 1 is a plan view of a hybrid vehicle having a regenerative braking system usable in combination with the illuminable display of the present invention.

Referring to FIG. 1, a schematic plan view of a hybrid vehicle 10 is shown, the vehicle 10 having a primary energy conversion system 24 that is driveably connectable with a rotatable output member 50, such as a driveshaft, of a transmission 18. The energy conversion system 24 is preferably an internal combustion engine, but may also be a fuel cell or other energy conversion system capable of generating sufficient torque for driving the rotatable output member 50 and axles 32 and/or 38 to thereby propel the vehicle 10.

The transmission 18 is selectively connected to the energy conversion system 24 using a torque transfer mechanism 25, such as a friction clutch or hydrodynamic torque converter. A plurality of wheels 30 are operatively attached to a front axle 32 preferably having a front differential 52F, and/or to a rear axle 38 preferably having a rear differential 52R. The differentials 52F, 52R are of the type known in the art and configured to transmit torque from the output member 50 to either or both of the axles 32, 38, as required, and to distribute torque between opposing wheels 30 of each axle 32, 38 as required.

Either or both of axles 32, 38 may be adapted to operate as drive axles suitable for powering the vehicle 10, depending on whether an all-wheel, front-wheel, or rear-wheel drive configuration is desired.

The hybrid transmission 18 is connected to a motor/generator 17, which is operable as a secondary or regenerative braking energy conversion system. Motor/generator 17 is electrically connected to a rechargeable energy storage system or device 19, such as a nickel-metal hydride (Ni-MH) or other battery type, and/or an electrochemical capacitor having a relatively high energy density. Energy in the form of electricity may be drawn from the energy storage device 19 to power the motor/generator 17 and transmission 18 when the motor/generator 17 is operating as a motor, and alternately transmitted to the energy storage device 19 and stored therein for later use when motor/generator 17 is acting as a generator.

The vehicle 10 is configured to utilize the dual motor/generator capabilities of motor/generator 17 to achieve a regenerative braking capability of the type known in the art. In general, by reversing the rotational direction of motor/generator 17, the vehicle 10 may be slowed or stopped while simultaneously converting a substantial portion of the expended braking energy into useful electricity, and storing that electricity for later use within an energy storage system 19. The transfer of energy or recharging rate is a detectable quantity represented in FIG. 1 as $B_R$. While vehicle 10 is shown as the preferred hybrid drive vehicle, those of ordinary skill in the art will appreciate that invention is also useable with a vehicle equipped with an alternate regenerative braking system, for example a vehicle that is adapted to recover hydraulic braking energy.

A conventional friction braking system 37, such as a disk brake, is preferably positioned in proximity to each wheel 30 to provide an auxiliary or back-up mechanical braking capability for the regenerative braking system, or for primary use while the vehicle 10 is traveling at a relatively high rate of speed. A sensor 12 is preferably operatively attached to both the motor/generator 17 and to a brake input device 11, such as a brake pedal or actuator, and configured to detect, measure, calculate, or otherwise determine the amount of regenerative braking occurring at a given instant by using either or both of the detected braking level $B_i$ and/or the detected motor speed $\omega_m$. The instantaneous amount of regenerative braking $B_R$ is transmitted or otherwise continuously communicated to a variably illuminable display 60 of the invention positioned within the passenger compartment of the vehicle 10, as discussed in more detail later hereinbelow.

Figure 2:
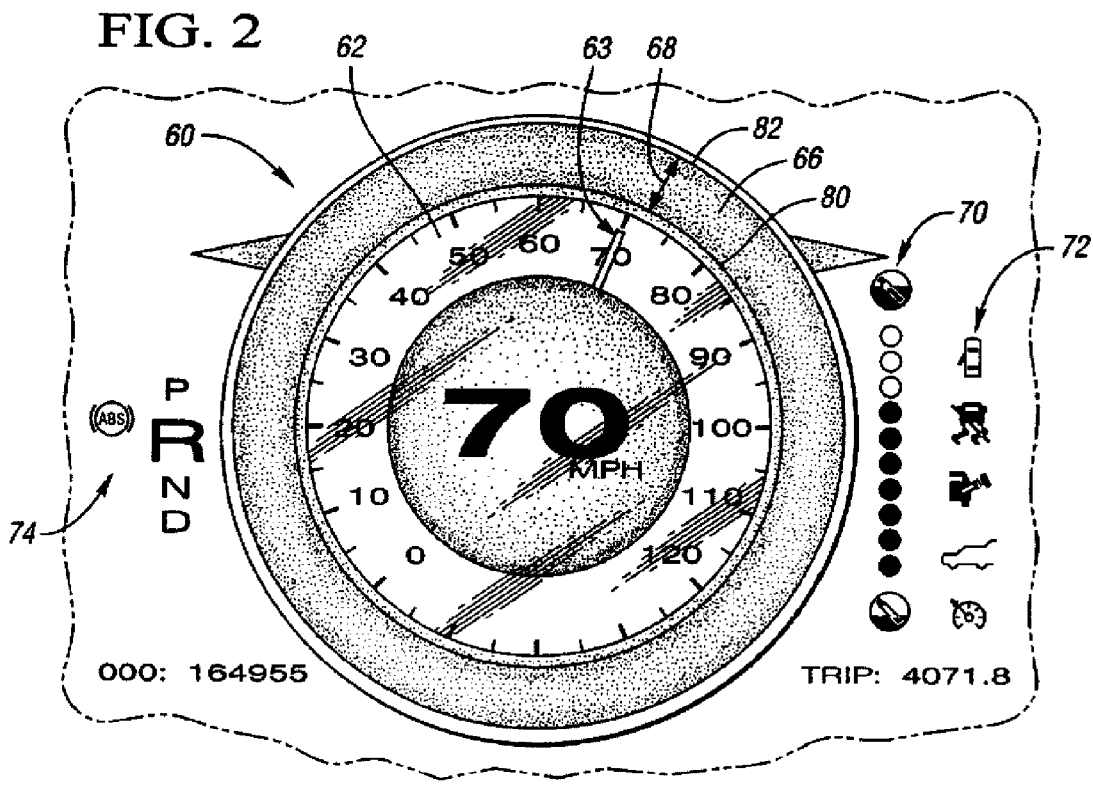
FIG. 2 is the illuminable display of the present invention.

Turning to FIG. 2, the variably illuminable display 60 includes a preferably circular gauge 62. Gauge 62 is shown as a speedometer having a moveable needle 63 and speed increments or hash marks arranged in an arch extending left to right, and a central display area 67 adapted to display the current vehicle speed in a digital format. Although a speedometer is shown in FIG. 2, those of ordinary skill in the art will understand that other gauges, such tachometers, braking level gauges, fuel gauges, or other such gauges are also useable within the scope of the invention. Also, the gauge 62 may alternately be presented to the driver using a heads up display or HUD separate from or in addition to the instrument display 60 to thereby allow the driver to view the information without averting attention from the road.

A plurality of vehicle status indicators 70, 72, 74 are positioned in proximity to the gauge 62, preferably on either side of the gauge 62 in an aesthetically pleasing position and with indicators of similar function grouped together For example, as shown in FIG. 2 the vehicle status indicators 70 are preferably commonly grouped and configured to provide vehicle status information such as the state or condition of the battery charge and/or low fuel levels. Vehicle status indicators 72 are preferably commonly grouped and configured to provide other information regarding vehicle status, such as anti-lock braking system status and the presence of open doors. Finally, vehicle status indicators 74 are preferably commonly grouped and provide vehicle drive condition status, i.e. the current drive state of the transmission 18.

In accordance with the invention, the gauge 62 is substantially circumscribed or encircled by a lightable/illuminable portion or halo 66 having an inner diameter 80 and an outer diameter 82, with halo 66 having a plurality of variable appearance features, as described later hereinbelow. The inner and outer diameters 80, 82 respectively form or delimit a variable breadth or width 68. The location of the inner diameter 80 is preferably fixed and coextensive with gauge 62 as shown in FIG. 2, and the position of the outer diameter 82 is preferably variably repositionable in response to the recharge rate $B_R$ (see FIG. 1) provided by the regenerative braking process.

In accordance with the invention, the variable width 68 of display 60 is variably illuminable in response to the instantaneous energy transfer or recharging rate $B_R$ (see FIG. 1) provided by the regenerative braking process. Variable width 68 is illuminable in a vivid and aesthetically pleasing color, such as blue, although other colors, shades, and/or combinations of colors or shades may be equally suitable for use with the invention.

In one embodiment, variable appearance features of halo 66 include intensity, shade, and/or color, which alternately increase and decrease proportionally in response to the recharging rate $B_R$. The illuminable halo 66 is minimized, transparent, or otherwise rendered substantially or totally invisible to the driver while the vehicle 10 is at a stand still, or the rate of regenerative braking $B_R$ is otherwise zero. The intensity of halo 66 then gradually increases proportionally in response to the recharging rate $B_R$ occurring relative to the onboard energy storage device 19 (see FIG. 1) due to the regenerative braking process. Likewise, as the rate of energy transfer decreases, the intensity of the halo 66 is gradually reduced or diminished until the halo 66 is once again rendered substantially or totally invisible to the driver.

In another embodiment, the variable appearance features further include variable width 68 of halo 66, with the variable width 68 alternately expanding and contracting proportionately in response to the recharging rate $B_R$ occurring within the regenerative braking system of vehicle 10. The variable width 68 is minimized or otherwise rendered substantially or totally undetectable to the driver while the vehicle 10 is at a stand still, or when the rate of regenerative braking $B_R$ is otherwise zero. The variable width 68 then gradually increases proportionally in response to the recharging rate $B_R$ occurring relative to the onboard energy storage device 19 (see FIG. 1) due to the regenerative braking process. Likewise, as the rate of energy transfer or recharging rate $B_R$ decreases, the variable width 68 is gradually reduced or diminished until the halo 66 is once again rendered substantially or totally undetectable to the driver.

By varying the intensity and/or variable width 68 of the halo 66 in this manner, an aesthetically pleasing and emotionally satisfying quality of feedback and awareness is provided to the driver of the vehicle. Additionally, the halo 66 provides an additional measure of safety by not requiring the driver to look away from the road in order to quickly determine the regenerative braking status, as the halo 66 would be peripherally visible to the driver.

While the best modes for carrying out the invention have been described in detail, those familiar with the art to which this invention relates will recognize various alternative designs and embodiments for practicing the invention within the scope of the appended claims.

The invention claimed is:

1. A variably illuminable display for use with a vehicle having a regenerative braking energy conversion system with an energy storage device and a detectable recharging rate, said display being an illuminable halo fully circumscribing an instrument gauge of said vehicle, and having at least one variable appearance feature that is controllably variable in proportionate response to said recharging rate.

2. The display of claim 1, wherein said at least one variable appearance feature is selected from the group of variable width, variable intensity, and variable color.

3. The display of claim 1, wherein said instrument gauge is a speedometer.

4. The display of claim 1, wherein said illuminable halo substantially circumscribing said instrument gauge has a variable width and a variable intensity, and wherein said display is adapted to elicit a positive emotional response by continuously varying at least one of said variable intensity and said variable width in proportionate response to said recharging rate.

5. A vehicle comprising:
   an energy storage device;
   a motor/generator adapted to provide regenerative braking of said vehicle and having a detectable energy transfer rate corresponding to the rate of transfer between said motor/generator and said energy storage device;
   a variably illuminable display fully circumscribing an instrument gauge, thereby forming a halo around said instrument gauge; and
   at least one sensor configured to detect said detectable rate and transmit said detectable rate to said variably illuminable display;
   wherein said halo of said variably illuminable display has at least one variable appearance feature that is in proportion to said detected rate.

6. The vehicle of claim 5, wherein said instrument gauge is a speedometer having a center display area configured to display the speed of said vehicle in a digital format.

7. The vehicle of claim 5, wherein said at least one variable feature is selected from the group of variable width, variable intensity, and variable color.

8. A method of displaying a detected rate of energy transfer between an energy storage device and a regenerative braking system aboard a vehicle, the method comprising:
   circumscribing an instrument gauge of the vehicle with a variably illuminable display;
   detecting and communicating said detected rate to said variably illuminable display; and
   sufficiently varying at least one of a width, a color, and an intensity of said display in proportionate response to said detected rate, whereby to improve an awareness of said detected rate.

9. The method of claim 8, wherein said variably illuminable display is a circular halo.

10. The method of claim 9, wherein said instrument gauge is a speedometer.

11. The method of claim 8, wherein each of said width, color, and intensity is proportionately variable in response to said detected rate.

12. The display of claim 3, wherein the speedometer also includes a central display area adapted to display a current vehicle speed in a digital format, said display fully circumscribing the central display area.

* * * * *